United States Patent
Saito et al.

(10) Patent No.: US 12,043,189 B2
(45) Date of Patent: Jul. 23, 2024

(54) WIRE HARNESS

(71) Applicant: SUMITOMO WIRING SYSTEMS, LTD., Yokkaichi (JP)

(72) Inventors: Ryuta Saito, Yokkaichi (JP); Katsutoshi Izawa, Yokkaichi (JP); Kosuke Tanaka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/989,203

(22) Filed: Nov. 17, 2022

(65) Prior Publication Data
US 2023/0166667 A1 Jun. 1, 2023

(30) Foreign Application Priority Data
Nov. 26, 2021 (JP) .................................. 2021-192264

(51) Int. Cl.
*B60R 16/02* (2006.01)
*H01B 7/40* (2006.01)
*H02G 3/32* (2006.01)

(52) U.S. Cl.
CPC ........... *B60R 16/0215* (2013.01); *H01B 7/40* (2013.01); *H02G 3/32* (2013.01)

(58) Field of Classification Search
CPC ............ B60R 16/0207; B60R 16/0215; H01B 7/0045; H02G 3/04; H02G 3/30; H02G 3/32

USPC ................................. 248/68.1, 73, 74.1–74.4
See application file for complete search history.

(56) References Cited

U.S. PATENT DOCUMENTS

| | | | | |
|---|---|---|---|---|
| 2,408,253 A * | 9/1946 | Diebold | ................... | H02G 7/00 174/136 |
| 5,332,183 A * | 7/1994 | Kagayama | ................. | B62J 6/03 248/223.41 |
| 7,740,211 B2 * | 6/2010 | Dukes | ...................... | H02G 1/08 248/74.1 |
| 8,505,858 B2 * | 8/2013 | Hansen | ................. | F16L 3/1226 174/664 |
| 2008/0105796 A1 * | 5/2008 | Nix | ......................... | F16L 3/222 248/74.1 |
| 2019/0089142 A1 | 3/2019 | Sugino | | |
| 2020/0274343 A1 | 8/2020 | Sugino | | |

FOREIGN PATENT DOCUMENTS

JP       2019-053894 A       4/2019

\* cited by examiner

*Primary Examiner* — Paresh Paghadal
(74) *Attorney, Agent, or Firm* — Oliff PLC

(57) ABSTRACT

A wire harness including: a wire harness body having an electric wire and a first cover covering a periphery of the electric wire; a first path restrictor attached to a periphery of the first cover and restricting a path of the wire harness body; a second path restrictor attached to the periphery of the first cover and restricting the path of the wire harness body; and a fixing member for fixing the second path restrictor to an attachment target.

6 Claims, 6 Drawing Sheets

WIRE HARNESS

BACKGROUND

The present disclosure relates to a wire harness.

Conventionally, some vehicle wire harnesses include a wire harness body having an electric wire member and a covering member covering the electric wire member, and a path-restricting member that is attached to the periphery of the covering member and restricts the path of the wire harness body (e.g., see JP 2019-53894M. The wire harness of JP 2019-53894A includes a cramp serving as a fixing member for fixing the path-restricting member to a vehicle body. This cramp has a holding portion that holds the path-restricting member while covering the entire periphery of the path-restricting member, and a fixture portion to be fixed to the vehicle body.

SUMMARY

In a configuration in which a wire harness includes a plurality of path-restricting members in the lengthwise direction of the wire harness, end portions of path-restricting members adjacent to each other in the lengthwise direction may overlap each other. That is, one of the path-restricting members adjacent to each other in the lengthwise direction of the wire harness covers the periphery of an end portion the other path-restricting member. Here, if the holding portion of the aforementioned cramp is attached to the area where the path-restricting members overlap each other due to, for example, constraints imposed by the vehicle, the size of the wire harness increases outward in the radial direction in the area where the cramp is attached.

An exemplary aspect of the disclosure provides a wire harness in which the area where a fixing member is attached can be downsized in the radial direction.

A wire harness of the present disclosure includes: a wire harness body having an electric wire and a first cover covering a periphery of the electric wire; a first path restrictor attached to a periphery of the first cover and restricting a path of the wire harness body; a second path restrictor attached to the periphery of the first cover and restricting the path of the wire harness body; and a fixing member for fixing the second path restrictor to an attachment target, wherein: the first path restrictor is open in a direction orthogonal to a lengthwise direction of the first path restrictor, and has an insertion opening extending over an entirety of the first path restrictor in the lengthwise direction thereof, the second path restrictor has a second cover covering a periphery of an end of the first path restrictor in the lengthwise direction thereof, the second cover has a first joint provided in a portion of the wire harness body in a circumferential direction thereof, and the fixing member has a fixture to be fixed to the attachment target, and a second joint joined to the first joint.

The wire harness of the present disclosure has the effect of downsizing, in the radial direction, the area where the fixing member is attached.

DETAILED DESCRIPTION OF EMBODIMENTS

Description of Embodiments of Present Disclosure

Figure 1:
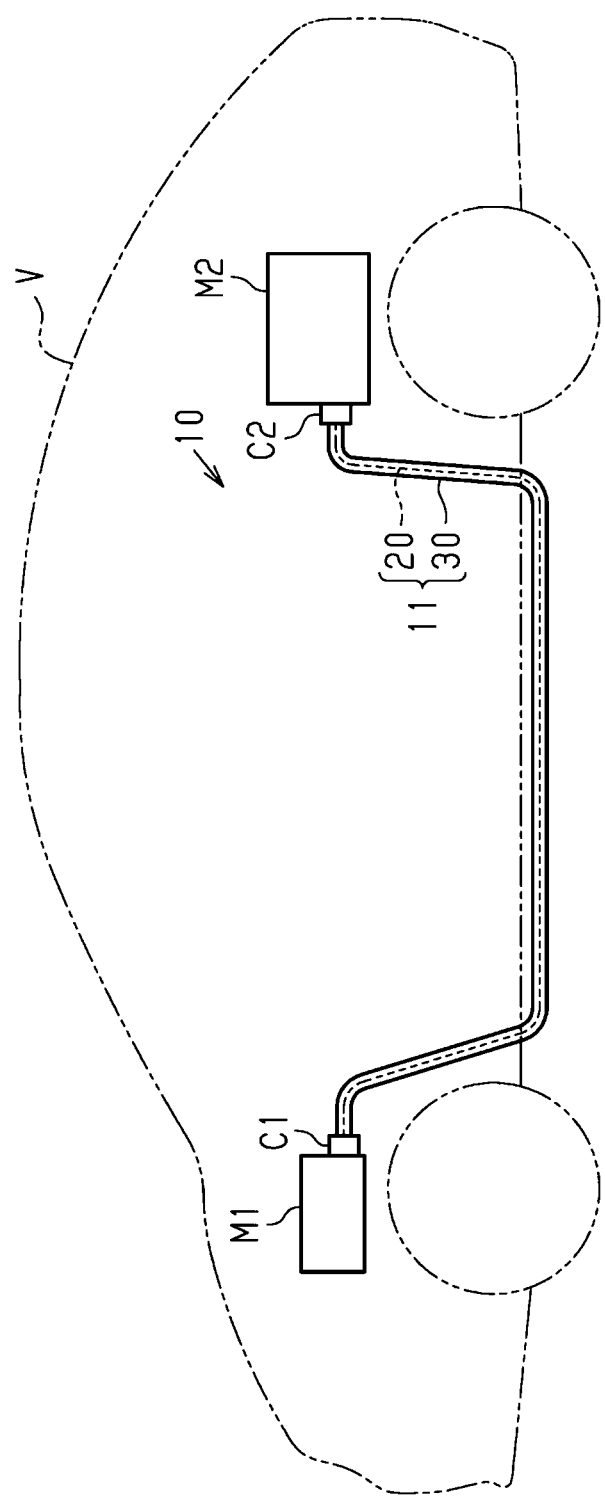
FIG. 1 shows a schematic configuration of a wire harness of an embodiment.

Firstly, embodiments of the present disclosure will be listed and described.

A wire harness of the present disclosure is

[1] a wire harness including: a wire harness body having an electric wire member and a covering member covering a periphery of the electric wire member; a first path-restricting member attached to a periphery of the covering member and restricting a path of the wire harness body; a second path-restricting member attached to the periphery of the covering member and restricting the path of the wire harness body; and a fixing member for fixing the second path-restricting member to an attachment target, wherein the first path-restricting member is open in a direction orthogonal to a lengthwise direction of the first path-restricting member, and has an insertion opening extending over an entirety of the first path-restricting member in the lengthwise direction, the second path-restricting member has a covering portion covering a periphery of an end portion of the first path-restricting member in the lengthwise direction, the covering portion has a first joint portion provided in a portion of the wire harness body in a circumferential direction, and the fixing member has a fixture portion to be fixed to the attachment target, and a second joint portion joined to the first joint portion.

According to this configuration, the second joint portion of the fixing member is joined to the first joint portion that is provided in a portion, in the circumferential direction, of the covering portion of the second path-restricting member. Therefore, the second joint portion need not be in a mode of covering the entire periphery of the covering portion that is adjacent to the first path-restricting member in the radial direction. Accordingly, the area where the fixing member is attached can be downsized in the radial direction.

[2] The second path-restricting member includes: a body portion restricting the path of the wire harness body; a receiver portion provided at an end portion of the body portion in the lengthwise direction of the wire harness body; and a lid portion covering, together with the receiver portion, an entire periphery of the end portion of the first path-restricting member in the lengthwise direction, and the receiver portion and the lid portion constitute the covering portion. According to this configuration, the receiver portion and the lid portion can constitute a covering portion that covers the periphery of the end portion of the first path-restricting member in the lengthwise direction.

[3] The first joint portion has a first receiver-side joint portion provided in the receiver portion, and a first lid-side joint portion provided in the lid portion, and the second joint portion has a second receiver-side joint portion joined to the first receiver-side joint portion, and a second lid-side joint portion joined to the first lid-side joint portion.

According to this configuration, the receiver portion and the lid portion are joined to each other via the second receiver-side joint portion and the second lid-side joint portion. That is, the lid portion can be kept from withdrawing from the receiver portion by attaching the fixing member to the covering portion.

[4] The covering portion has a hinge portion connecting a first circumferential end portion of the receiver portion to a first circumferential end portion of the lid portion, the lid portion is rotatable between an open position and a closed position at which the lid portion covers the wire harness body, with the hinge portion as a rotation axis, the first receiver-side joint portion is provided at the first circumferential end portion of the receiver portion, and the first lid-side joint portion is provided at the first circumferential end portion of the lid portion.

According to this configuration, the fixing member in a state of being attached to the covering portion makes it difficult for the lid portion at the closed position to rotate in the opening direction. That is, the fixing member attached to the covering portion makes it easy to maintain the lid portion located at the closed position.

[5] One of the first joint portion and the second joint portion is a recessed portion, and the other one of the first joint portion and the second joint portion is a protruding portion fitted to the recessed portion.

According to this configuration, the first joint portion can be joined to the second joint portion with a simple configuration.

[6] The second joint portion is attachable to the first joint portion by sliding the second joint portion in a lengthwise direction of the second path-restricting member.

According to this configuration, the second joint portion can be attached to the first joint portion by sliding the second joint portion in the lengthwise direction of the second path-restricting member. Therefore, the fixing member can be easily attached to the covering portion of the second path-restricting member.

[7] The first joint portion has a movement restricting portion restricting movement of the second joint portion in the lengthwise direction of the second path-restricting member.

According to this configuration, the movement restricting portion can suppress withdrawal of the second joint portion from the first joint portion.

[8] The first path-restricting member restricts a path of a linear portion that is a linear part of the path of the wire harness body, and the second path-restricting member restricts a path of a bent portion that is a bent part of the path of the wire harness body.

According to this configuration, the first path-restricting member restricts the path of the linear portion, and the second path-restricting member restricts the path of the bent portion. Thus, the paths of the linear portion and the bent portion of the wire harness body are continuously kept from deviating from respective desired paths.

Details of Embodiments of Present Disclosure

Specific examples of the wire harness of the present disclosure will be described below with reference to the drawings. The drawings may partially exaggerate or simplify configurations for convenience of description. The dimensional ratio of each part may differ between the drawings. "Being orthogonal" in the present specification includes not only the case of being strictly orthogonal but also the case of being substantially orthogonal within the range that exhibits the operation and effects of the present embodiment.

"Opposing" in the present specification means that faces or members are at positions directly facing each other, and includes not only the case of being at positions completely facing each other but also the case of being at positions partially facing each other. Further, "opposing" in the present specification includes both the case where another member is interposed between two parts and the case where nothing is interposed between two parts.

The term "annular" used in the description of the present specification may indicate any structure that forms a loop, an endless continuous shape, or a generally loop-shaped structure with a gap, such as a C-shape. Note that the "annular" shapes include a circular shape, an elliptical shape, and a polygonal shape having sharp or round corners, but are not limited thereto.

Overall Configuration of Wire Harness 10

A wire harness 10 shown in FIG. 1 is, for example, installed in a vehicle V, such as a hybrid vehicle or an electric vehicle. The wire harness 10 electrically connects two or more in-vehicle devices to each other. The in-vehicle devices are electrical devices installed in the vehicle V. The wire harness 10 electrically connects an inverter M1 installed in a front part of the vehicle V to a high-voltage battery M2 installed behind the inverter M1 in the vehicle V, for example. The wire harness 10 has an elongated shape extending in the front-back direction of the vehicle V, for example. The wire harness 10 is arranged in the vehicle V so that an intermediate section of the wire harness 10 in the lengthwise direction passes outside the vehicle interior, e.g., under the floor of the vehicle V, for example.

The inverter M1 is connected to a motor (not shown) for driving wheels that serves as a power source for the vehicle to travel, for example. The inverter M1 generates AC power from DC power of the high-voltage battery M2, and supplies the AC power to the motor. The high-voltage battery M2 is, for example, a battery capable of supplying a voltage of several hundred volts.

The wire harness 10 has a wire harness body 11. The wire harness body 11 has an electric wire member 20 (electric wire) and a cylindrical covering member 30 (first cover) that covers the periphery of the electric wire member 20. The wire harness 10 has connectors C1 and C2 attached to respective end portions of the electric wire member 20. One end portion of the electric wire member 20 in the lengthwise direction is connected to the inverter M1 via the connector C1, and the other end portion of the electric wire member 20 in the lengthwise direction is connected to the high-voltage battery M2 via the connector C2.

Figure 2:
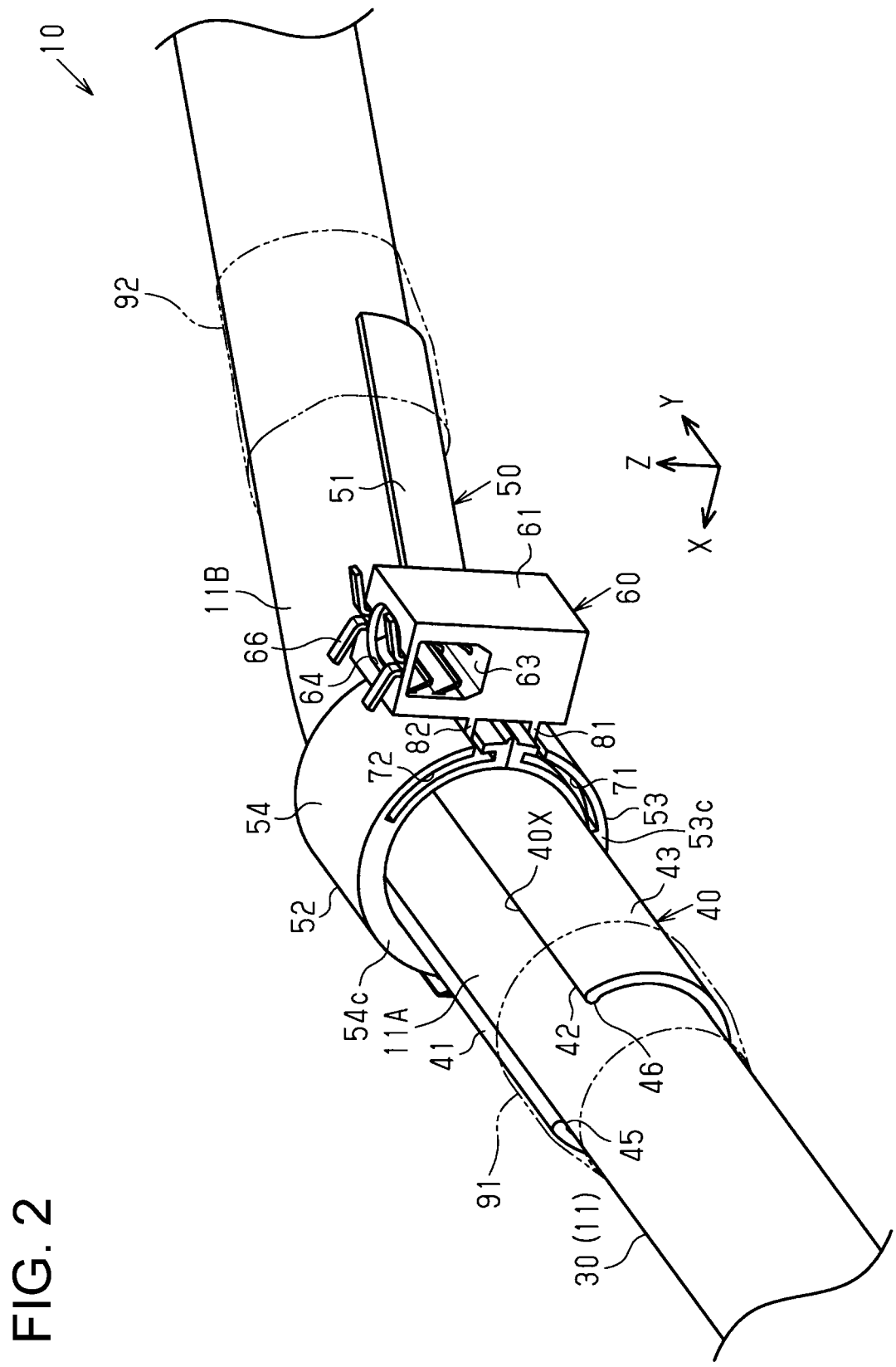
FIG. 2 is a schematic perspective view of the wire harness of the embodiment.

As shown in FIG. 2, the wire harness 10 has a first path-restricting member 40 (first path restrictor) that is attached to the periphery of the covering member 30, and a second path-restricting member 50 (second path restrictor) that is attached to the periphery of the covering member 30. The first path-restricting member 40 and the second path-restricting member 50 restrict the path through which the wire harness body 11 is arranged. The wire harness 10 also includes a fixing member 60 for fixing the second path-restricting member 50 to the vehicle V. Note that FIG. 1 omits the first path-restricting member 40, the second path-restricting member 50, and the fixing member 60.

Configuration of Electric Wire Member 20

Figure 3:
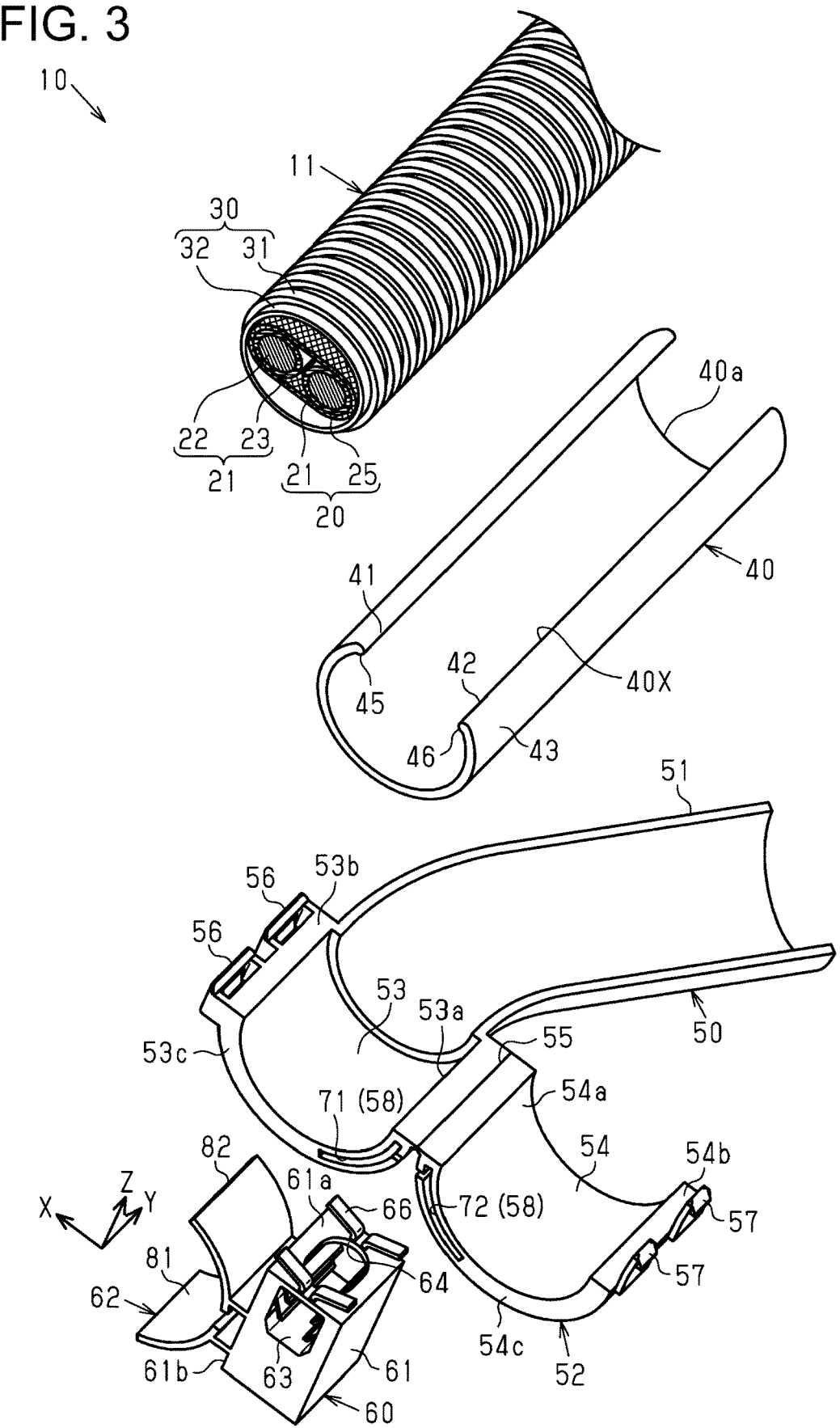
FIG. 3 is a schematic exploded perspective view of the wire harness of the embodiment.
Figure 4:
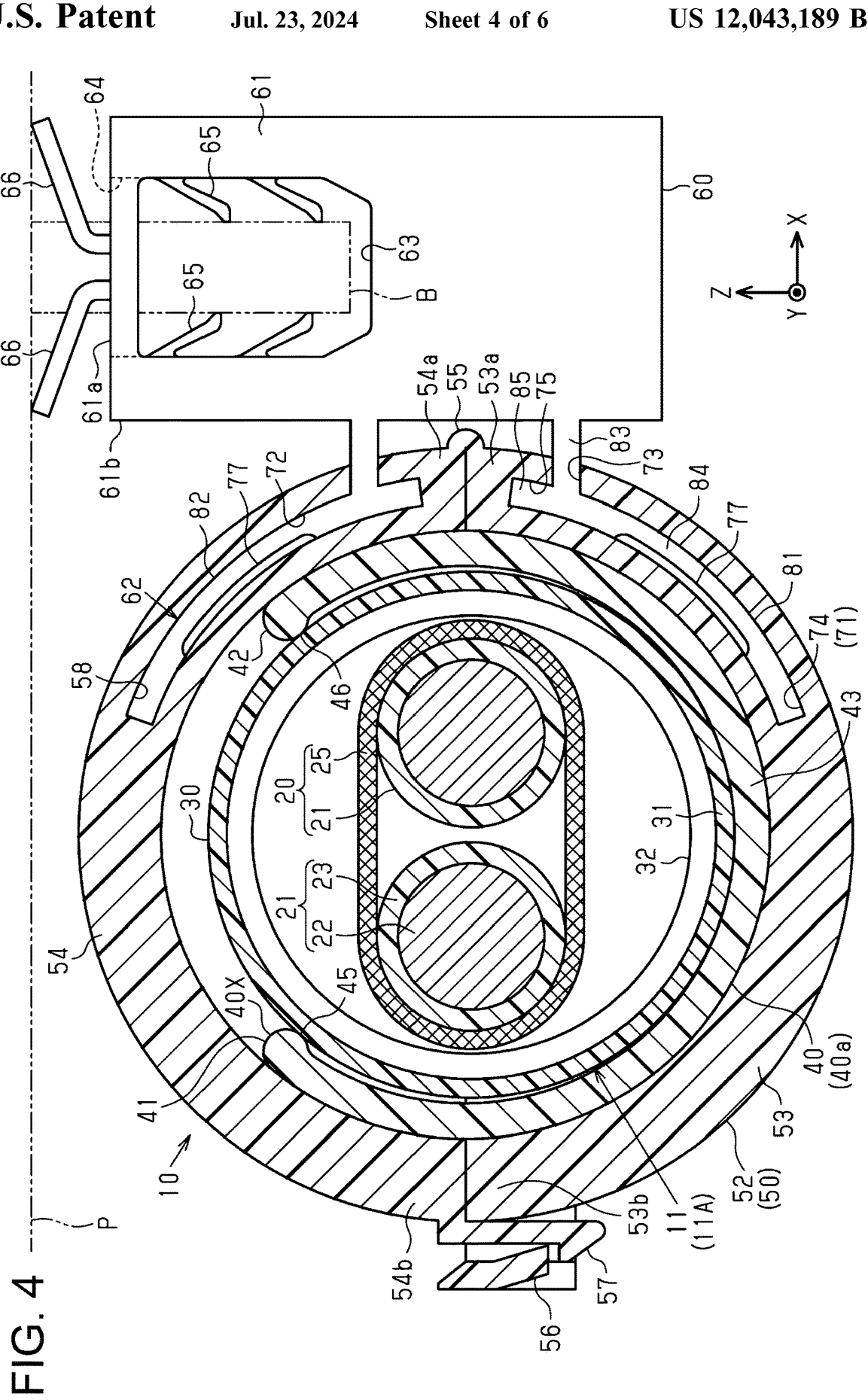
FIG. 4 is a schematic lateral cross-sectional view of the wire harness of the embodiment.

As shown in FIGS. 3 and 4, the electric wire member 20 has, for example, one or more (two in the present embodiment) electric wires 21, and a braided member 25 that collectively surrounds the periphery of the plurality of electric wires 21, for example.

Each electric wire 21 is a coated electric wire having a conductive core wire 22 and an insulating coating 23 that surrounds the periphery of the core wire 22. The electric wires 21 are high-voltage electric wires capable of dealing with high voltage and large current, for example. The electric wires 21 may be unshielded electric wires that do not have their own electromagnetic shield structure, or may be shielded electric wires having their own electromagnetic shield structure, for example. The electric wires 21 of the present embodiment are unshielded electric wires.

The core wire 22 may be, for example, a stranded wire formed by twisting a plurality of metal wires together, or by a single core wire made from a single conductor. The single core wire may be, for example, a column conductor constituted by a single columnar metal rod having an internally solid structure, or may be a cylindrical conductor having an internally hollow structure. The core wire 22 may also be a combination of a stranded wire, a column conductor and/or a cylindrical conductor. The material of the core wire 22 can be a copper- or aluminum-based metal material, for example.

The insulating coating 23 entirely covers the peripheral face of the core wire 22 in the circumferential direction, for example. The insulating coating 23 is made of an insulating resin material, for example.

The shape of a cross section of each electric wire 21 obtained by cutting the electric wire 21 by a plane orthogonal to the lengthwise direction of the electric wires 21, i.e., the lateral cross-sectional shape of the electric wire 21 may be any shape. The lateral cross-sectional shape of each electric wire 21 is, for example, a circular shape, a semicircular shape, a polygonal shape, a square shape, a flat shape, or the like. The lateral cross-sectional shape of each electric wire 21 of the present embodiment is a circular shape.

The braided member 25 has a tubular shape that collectively surrounds the periphery of the plurality of electric wires 21 as a whole, for example. The braided member 25 can be, for example, a braided wire formed by braiding a plurality of metal wires, or a braided wire that is formed by braiding metal wires and resin wires in combination, for example. The material of the metal wires may be a copper- or aluminum-based metal material, for example. Although not shown in the figures, both end portions of the braided member 25 in the lengthwise direction are connected to earth at the connectors C1 and C2 (see FIG. 1), for example.

Configuration of Covering Member 30

The covering member 30 has a tubular shape that surrounds the entire periphery of the electric wire member 20 in the circumferential direction. The covering member 30 of the present embodiment has a cylindrical shape. The covering member 30 has, for example, a peripheral wall that is entirely continuous in the circumferential direction of the covering member 30. The covering member 30 seals the inside of the covering member 30 over the entire periphery in the circumferential direction, for example. The covering member 30 has a function of protecting the electric wire member 20 from flying objects and water droplets, for example.

The covering member 30 is flexible and can be easily bent, for example. Examples of a flexible covering member 30 include a resin corrugated tube and a rubber waterproofing cover, for example. The covering member 30 of the present embodiment is a resin corrugated tube having a bellows shape whose diameter repeatedly increases and decreases in the lengthwise direction of the covering member 30. That is, the covering member 30 of the present embodiment has a bellows structure in which a large-diameter portion 31 and a small-diameter portion 32 whose diameter is smaller than that of the large-diameter portion 31 are alternately and continuously provided in the lengthwise direction of the covering member 30. Each of the large-diameter portion 31 and the small-diameter portion 32 has an annular shape that circles once in the circumferential direction of the covering member 30, for example. The material of the covering member 30 may be, for example, polyolefin, polyamide, polyester, a synthetic resin such as ABS resin, or the like. Note that FIG. 2 simplifies the covering member 30 for simplification of the drawing.

Configuration of First Path-Restricting Member 40 and Second Path-Restricting Member 50

As shown in FIGS. 2 and 3, the first path-restricting member 40 and the second path-restricting member 50 hold the covering member 30. The first path-restricting member 40 and the second path-restricting member 50 are harder than the covering member 30, for example. The first path-restricting member 40 and the second path-restricting member 50 have a hardness that makes it difficult for them to bend portion in a direction orthogonal to the lengthwise direction of the wire harness body 11 compared to the covering member 30. The first path-restricting member 40 and the second path-restricting member 50 thus restrict the path of the wire harness body 11. For example, the first path-restricting member 40 and the second path-restricting member 50 assist the covering member 30 so that the wire harness body 11 does not warp due to its own weight and deviate from a desired path.

As shown in FIG. 2, the first path-restricting member 40 is provided in portions of the wire harness body 11 in the lengthwise direction. The first path-restricting member 40 is attached to the periphery of the covering member 30 in a linear portion 11A, which is a linear part of the path of the wire harness body 11, for example. The first path-restricting member 40 restricts the path of the wire harness body 11 in the linear portion 11A. Here, the linear portion 11A is a portion in which the path of the wire harness body 11 linearly extends in one direction. Note that one or more first path-restricting members 40 are provided in accordance with the path of the wire harness body 11.

The second path-restricting member 50 is provided in portions of the wire harness body 11 in the lengthwise direction. The second path-restricting member 50 is attached to the periphery of the covering member 30 in a bent portion 11B, which is a portion at which the path of the wire harness body 11 is bent, for example. The second path-restricting member 50 restricts the path of the wire harness body 11 in the bent portion 11B. Here, the bent portion 11B is a portion in which the path of the wire harness body 11 is bent to deviate from a straight line. Note that one or more second path-restricting members 50 are provided in accordance with the path of the wire harness body 11.

Configuration of First Path-Restricting Member 40

As shown in FIGS. 2 and 4, the first path-restricting member 40 covers the periphery of the covering member 30 partially in the circumferential direction thereof. The first path-restricting member 40 has a shape that covers the periphery of the covering member 30 partially in the circumferential direction thereof. The lateral cross-sectional shape of the first path-restricting member 40 is a C-shape as a whole. The first path-restricting member 40 covers an area that is more than half of the periphery of the covering member 30, for example. That is, the first path-restricting member 40 covers an area that is more than half of the entire periphery of the covering member 30 in the circumferential direction thereof.

As shown in FIG. 2, the first path-restricting member 40 extends in the lengthwise direction of the covering member 30 in the linear portion 11A. The first path-restricting member 40 has a shape that linearly extends in one direction, for example. The lateral cross-sectional shape of the first path-restricting member 40 is uniform over the entire length of the first path-restricting member 40 in the lengthwise direction, for example.

The first path-restricting member 40 is made of metal or resin, for example. The first path-restricting member 40 of the present embodiment is made of resin. Examples of the material of the first path-restricting member 40 can include synthetic resins such as polypropylene, polyamide, and polyacetal. The first path-restricting member 40 can be produced by means of any well-known production method such as extrusion or injection molding, for example. In the present embodiment, the first path-restricting member 40 is an extruded product that is produced by means of extrusion. Accordingly, the first path-restricting member 40 can be easily produced by using an extruder that extrudes the raw material of the first path-restricting member 40 in the lengthwise direction. Further, multiple types of first path-restricting members 40 with different dimensions in the lengthwise direction can be produced by using a single extruder. For example, multiple types of first path-restricting members 40 with different dimensions in the lengthwise direction can be produced by cutting the base material of the first path-restricting member 40 formed with a single extruder at any length using a cutting machine.

As shown in FIGS. 3 and 4, the first path-restricting member 40 has an insertion opening 40X that is open in a direction orthogonal to the lengthwise direction of the first path-restricting member 40. The insertion opening 40X extends over the entirety of the first path-restricting member 40 in the lengthwise direction. The first path-restricting member 40 has a first end portion 41 and a second end portion 42 that are two end portions of the first path-restricting member 40 in the circumferential direction and form the insertion opening 40X. The first path-restricting member 40 has a joint portion 43 that joins the first end portion 41 to the second end portion 42. In other words, the first path-restricting member 40 has a joint portion 43 that partially covers the covering member 30 in the circumferential direction, a first end portion 41 and a second end portion 42 provided at respective end portions of the joint portion 43, and an insertion opening 40X formed by the first end portion 41 and the second end portion 42.

The joint portion 43 constitutes a main part of the first path-restricting member 40. The thickness of the joint portion 43 in the radial direction is uniform in the circumferential direction of the first path-restricting member 40, for example. The lateral cross-sectional shape of the joint portion 43 is a shape aligned with the outer face of the covering member 30, for example. The lateral cross-sectional shapes of the first end portion 41, the second end portion 42, and the joint portion 43 are arc shapes, for example.

The first end portion 41 and the second end portion 42 are provided on the opposite sides in the circumferential direction of the first path-restricting member 40. The first end portion 41 and the second end portion 42 are separated from each other in the circumferential direction of the first path-restricting member 40 with the insertion opening 40X therebetween. In other words, the gap between the first end portion 41 and the second end portion 42 in the circumferential direction of the first path-restricting member 40 constitutes the insertion opening 40X. Thus, the first path-restricting member 40 has a C-shape having the insertion opening 40X at a portion of the first path-restricting member 40 in the circumferential direction.

The lateral cross-sectional shapes of leading ends of the first end portion 41 and the second end portion 42 are curved shapes. The lateral cross-sectional shapes of the leading ends of the first end portion 41 and the second end portion 42 of the present embodiment are arc shapes.

The first path-restricting member 40 has a protruding portion 45 (protrusion) that protrudes from an inner face of the first end portion 41, and a protruding portion 46 that protrudes from an inner face of the second end portion 42. The protruding portions 45 and 46 protrude toward the covering member 30 inserted in the first path-restricting member 40 and are in contact with the outer face of the covering member 30. The protruding portions 45 and 46 are in contact with the outer face of the large-diameter portion 31 of the covering member 30. The protruding portion 45 protrudes from the inner face of the leading end of the first end portion 41, for example. The protruding portion 46 protrudes from the inner face of the leading end of the second end portion 42, for example. The lateral cross-sectional shapes of the protruding portions 45 and 46 are curved shapes, for example. The lateral cross-sectional shapes of the protruding portions 45 and 46 of the present embodiment are arc shapes. The protruding portions 45 and 46 extend in the lengthwise direction of the first path-restricting member 40. The protruding portions 45 and 46 extend over the entire length of the first path-restricting member 40 in the lengthwise direction, for example.

The protruding portions 45 and 46 presses the covering member 30 from outside the covering member 30. The protruding portions 45 and 46 and the joint portion 43 elastically hold the covering member 30. Thus, the first path-restricting member 40 is firmly joined to the covering member 30.

As shown in FIG. 4, the opening width of the insertion opening 40X, i.e., the shortest distance between the first end portion 41 and the second end portion 42 is smaller than the outer diameter of the covering member 30.

The opening width of the insertion opening 40X increases in response to elastic deformation of the first path-restricting member 40. For example, the opening width of the insertion opening 40X increases as a result of the covering member 30 being inserted into the insertion opening 40X from a direction orthogonal to the lengthwise direction of the first path-restricting member 40.

After the covering member 30 is inserted into the first path-restricting member 40, the first path-restricting member 40 is elastically restored to return to its original shape. The opening width of the insertion opening 40X then becomes smaller than the outer diameter of the covering member 30, and the first path-restricting member 40 is thus attached to the periphery of the covering member 30.

Configuration of Second Path-Restricting Member 50

As shown in FIG. 2, the second path-restricting member 50 is attached to the periphery of the covering member 30 in the bent portion 11B. The second path-restricting member 50 extends in the lengthwise direction of the covering member 30 in the bent portion 11B. The second path-restricting member 50 is bent along the shape of the bent portion 11B, for example.

The second path-restricting member 50 is made of metal or resin, for example. The second path-restricting member 50 of the present embodiment is made of resin. Examples of the material of the second path-restricting member 50 can include synthetic resins such as polypropylene, polyamide, and polyacetal. The second path-restricting member 50 can be produced by means of any well-known production method such as injection molding, for example.

The second path-restricting member 50 has a body portion 51 (body) and a covering portion 52 (second cover) that covers an end portion 40a of the first path-restricting member 40 in the lengthwise direction.

The body portion 51 has an elongated shape that extends in the lengthwise direction of the covering member 30 in the bent portion 11B, for example. The body portion 51 extends along the path of the bent portion 11B, for example. That is, the body portion 51 has a bent shape that is bent along the shape of the bent portion 11B. The body portion 51 covers the periphery of the covering member 30 partially in the circumferential direction thereof. The body portion 51 covers an area that is approximately half of the periphery of the covering member 30, for example. For example, the body portion 51 covers an area at approximately 180° in the periphery of the covering member 30. The body portion 51 forms a substantially semi-cylindrical shape, for example.

The covering portion 52 is provided at one end portion of the body portion 51 in the lengthwise direction. The covering portion 52 has a receiver portion 53 (receiver) that is integrally formed with the one end portion of the body portion 51 in the lengthwise direction, and a lid portion 54 (lid) that covers the receiver portion 53.

The receiver portion 53 covers the periphery of the first path-restricting member 40 partially in the circumferential direction thereof. The receiver portion 53 covers, partially in the circumferential direction, the end portion 40a of the first path-restricting member 40 in the lengthwise direction. The receiver portion 53 has a shape that covers the periphery of the first path-restricting member 40 partially in the circumferential direction thereof. The lateral cross-sectional shape of the receiver portion 53 is a semi-cylindrical shape as a whole. The receiver portion 53 has a semi-cylindrical shape whose diameter is larger than that of the body portion 51, for example. The receiver portion 53 covers half of the periphery of the first path-restricting member 40, for example.

The lid portion 54 covers the entire periphery of the end portion 40a of the first path-restricting member 40 together with the receiver portion 53. Specifically, the lid portion 54 entirely covers the end portion 40a of the first path-restricting member 40 along the periphery of the end portion 40a in the circumferential direction, together with the receiver portion 53. The lid portion 54 of the present embodiment covers a portion of the periphery of the first path-restricting member 40 and a portion of the periphery of the covering member 30 that is exposed from the insertion opening 40X.

The lateral cross-sectional shape of the lid portion 54 has a semi-cylindrical shape as a whole. The lid portion 54 has a semi-cylindrical shape with the same diameter as the diameter of the receiver portion 53. The lid portion 54 covers half of the periphery of the first path-restricting member 40 in the circumferential direction that is a portion of the periphery of the first path-restricting member 40 in the circumferential direction not being covered by the receiver portion 53.

The lid portion 54 is integrally formed with the receiver portion 53, for example. Specifically, the covering portion 52 has a hinge portion 55 (hinge) that connects the receiver portion 53 to the lid portion 54, for example. The hinge portion 55 connects a first circumferential end portion 53a of the receiver portion 53 to a first circumferential end portion 54a of the lid portion 54. One or more (two in the present embodiment) lock portions 56 are provided at a second circumferential end portion 53b of the receiver portion 53. One or more (two in the present embodiment) claw portions 57 are provided at a second circumferential end portion 54b of the lid portion 54.

The lid portion 54 is rotatable between an open position shown in FIG. 3 and a closed position shown in FIGS. 2 and 4, with the hinge portion 55 as an axis. As shown in FIG. 4, the claw portions 57 are hooked into the lock portions 56 when the lid portion 54 is at the closed position. Thus, the lid portion 54 is held at the closed position.

The receiver portion 53 and the lid portion 54 are thus joined to each other. With the receiver portion 53 joined to the lid portion 54, the covering portion 52 forms an annular shape that collectively surrounds the periphery of the covering member 30 and the end portion 40a of the first path-restricting member 40. The covering portion 52 has a first joint portion 58 (first joint) to which the fixing member 60 is joined. The first joint portion 58 is provided in a portion of the covering portion 52 in the circumferential direction.

Note that the wire harness 10 has a first slide restriction member 91 that restricts sliding movement of the first path-restricting member 40 in the lengthwise direction of the covering member 30, for example, as shown in FIG. 2. The wire harness 10 also has a second slide restriction member 92 that restricts sliding movement of the second path-restricting member 50 in the lengthwise direction of the covering member 30, for example. The first slide restriction member 91 and the second slide restriction member 92 may be, for example, resin or metal cable ties, crimping rings, adhesive tapes, or the like. The first slide restriction member 91 and the second slide restriction member 92 of the present embodiment are adhesive tapes. The first slide restriction member 91 is wound around an end portion of the first path-restricting member 40 on the side not joined to the second path-restricting member 50, and the covering member 30.

The second slide restriction member 92 is wound around an end portion of the second path-restricting member 50 on the side not joined to the first path-restricting member 40, and the covering member 30.

Configuration of Fixing Member 60

As shown in FIG. 4, the fixing member 60 is for fixing the second path-restricting member 50 to a panel P that constitutes the floor portion of the vehicle V. The fixing member 60 is made of metal or resin, for example. The fixing member 60 of the present embodiment is made of resin. Examples of the material of the fixing member 60 include synthetic resins such as polypropylene, polyamide, and polyacetal. The fixing member 60 can be produced by means of any well-known production method such as injection molding, for example.

As shown in FIGS. 3 and 4, the fixing member 60 has a fixture portion 61 (fixture), which is to be fixed to the panel P, and a second joint portion 62 (second joint) that is joined to the first joint portion 58 of the second path-restricting member 50.

As an example, the fixture portion 61 has a structure that is to be fixed to a bolt B extending from the panel P. The fixture portion 61 has an insertion hole portion 63 into which the bolt B is to be inserted. Note that FIG. 4 shows three directions of the fixing member 60 that are orthogonal to each other, namely a widthwise direction X, a depth direction Y, and a height direction Z. The bolt B is inserted into the insertion hole portion 63 in the height direction Z.

The fixture portion 61 has a first side face 61*a* that opposes the panel P when the fixture portion 61 is in a state of being attached to the vehicle V. The insertion hole portion 63 is open on one end side in the height direction Z in the first side face 61*a*. That is, the insertion hole portion 63 includes a bolt insertion opening 64 into which the bolt B is inserted, in the first side face 61*a*. Note that the insertion hole portion 63 of the present embodiment is also open on both sides in the depth direction Y.

As shown in FIG. 4, locking portions 65, which are locked in the axial direction to the bolt B inserted into the fixture portion 61 from the bolt insertion opening 64, are provided inside the insertion hole portion 63. The locking portions 65 extend from a pair of inner wall faces that oppose each other in the widthwise direction X within the insertion hole portion 63, for example. For example, a plurality of locking portions 65 are arranged in the height direction Z. The locking portions 65 are inclined forward in the direction in which the bolt B is inserted, while extending inward from the pair of inner wall faces, for example. Each locking portion 65 is locked in the axial direction to the thread of the bolt B at its leading end portion.

The fixture portion 61 has elastic pieces 66 in the first side face 61*a*. The elastic piece 66 are provided on both sides of the insertion hole portion 63 in the depth direction Y, for example. The elastic pieces 66 come into elastic contact with the panel P when in a state of being attached to the vehicle V. That is, the elastic pieces 66 apply the elastic force to the panel P. This suppresses looseness of the fixing member 60.

Configuration of First Joint Portion 58 and Second Joint Portion 62

The first joint portion 58 of the covering portion 52 has a first receiver-side joint portion 71 (first receiver-side joint) that is provided in the first circumferential end portion 53*a* of the receiver portion 53, and a first lid-side joint portion 72 (first lid-side joint) that is provided in the first circumferential end portion 54*a* of the lid portion 54. The second joint portion 62 of the fixing member 60 has a second receiver-side joint portion 81 (second receiver-side joint) that is joined to the first receiver-side joint portion 71, and a second lid-side joint portion 82 (second lid-side joint) that is joined to the first lid-side joint portion 72.

The second receiver-side joint portion 81 and the second lid-side joint portion 82 are, for example, protrusions that protrude from a second side face 61*b* of the fixture portion 61 in the widthwise direction X. Note that the second receiver-side joint portion 81 and the second lid-side joint portion 82 of the present embodiment are integrally formed with the fixture portion 61. The first receiver-side joint portion 71 and the first lid-side joint portion 72 are recessed portions (recesses) to which the second receiver-side joint portion 81 and the second lid-side joint portion 82 are fitted, respectively.

The first receiver-side joint portion 71 is provided in a portion of the receiver portion 53 in the circumferential direction. The first lid-side joint portion 72 is provided in a portion of the lid portion 54 in the circumferential direction.

The first receiver-side joint portion 71 and the first lid-side joint portion 72 each have a substantially T-shaped cross section orthogonal to the lengthwise direction of the second path-restricting member 50. Specifically, the first receiver-side joint portion 71 and the first lid-side joint portion 72 each have a first accommodating portion 73 and a pair of second accommodating portions 74 and 75. The first accommodating portion 73 extends in the radial direction of the covering portion 52 from the peripheral face of the covering portion 52 within the wall thickness of the covering portion 52. The pair of second accommodating portions 74 and 75 extend from the first accommodating portions 73 in the opposite directions along the circumferential direction of the covering portion 52. The second accommodating portion 75 extends from the first accommodating portion 73 toward the hinge portion 55, and the second accommodating portion 74 extends in the opposite direction to the second accommodating portion 75. As for the lengths of the two second accommodating portions 74 and 75 in the circumferential direction, the second accommodating portion 74 is longer than the second accommodating portion 75, for example.

The second receiver-side joint portion 81 and the second lid-side joint portion 82 each have a cross section orthogonal to the lengthwise direction of the second path-restricting member 50 that substantially has a T-shape similar to the cross-sectional shapes of the first receiver-side joint portion 71 and the first lid-side joint portion 72. Specifically, the second receiver-side joint portion 81 and the second lid-side joint portion 82 each have a base 83 that extends in the widthwise direction X from the second side face 61*b*, and a pair of extensions 84 and 85 that extend in two different directions from a leading end of the base 83. The base 83 is fitted to the first accommodating portion 73. The two extensions 84 and 85 are fitted to the respective second accommodating portions 74 and 75. The pair of extensions 84 and 85 extend from the leading end of the base 83 in the opposite directions along the circumferential direction of the covering portion 52. As for the lengths of the two extensions 84 and 85 in the circumferential direction, the extension 84 is longer than the extension 85, for example. The extension 84 is fitted to the second accommodating portion 74. The extension 85 is fitted to the second accommodating portion 75.

Figure 5:
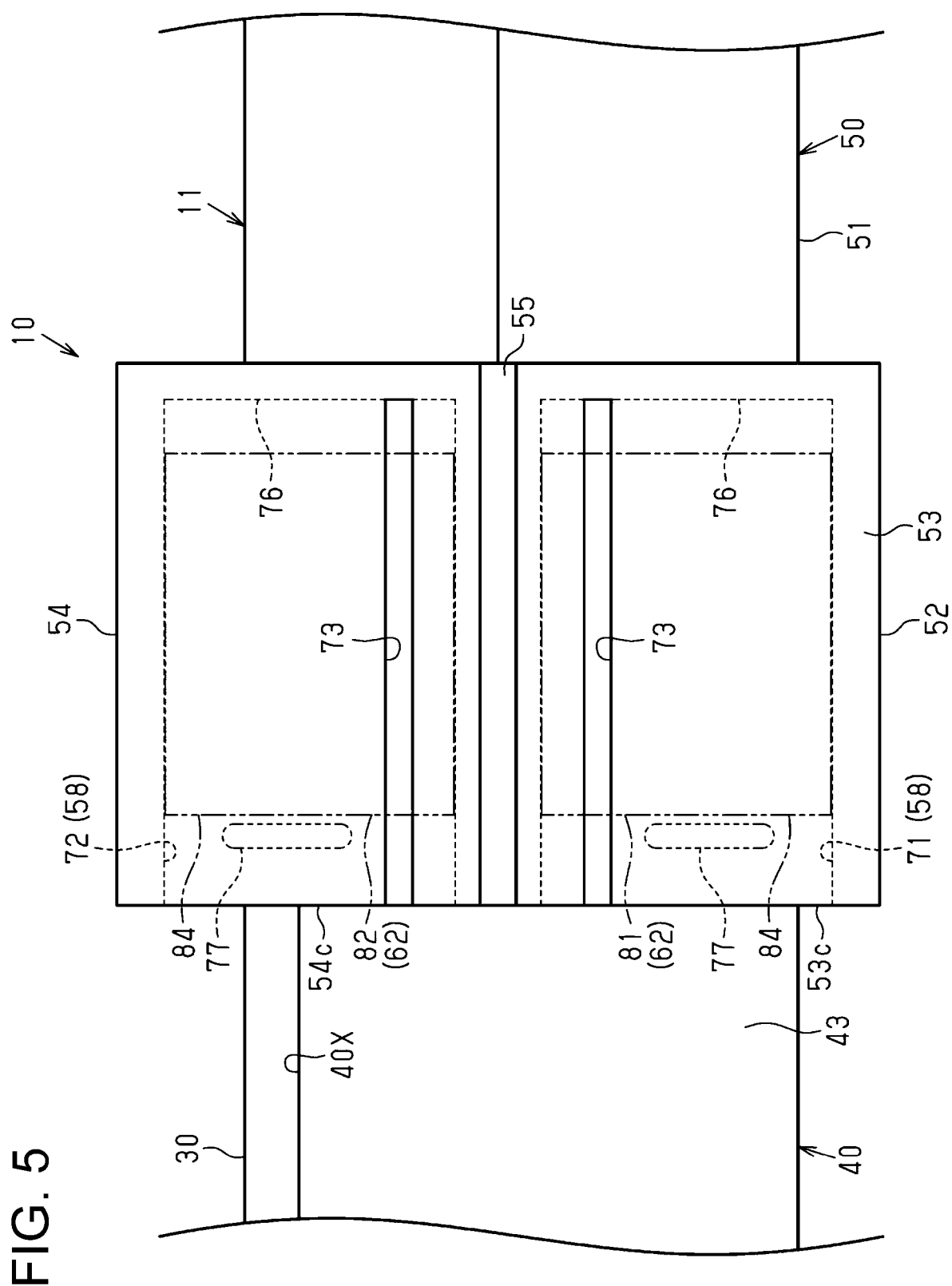
FIG. 5 is a schematic side view of a region around a covering portion of the wire harness of the embodiment.

As shown in FIGS. 2 and 5, the first joint portion 58 extends to one end portion of the covering portion 52 in the lengthwise direction of the second path-restricting member 50. That is, the first receiver-side joint portion 71 extends in the lengthwise direction of the second path-restricting member 50 to an end portion 53*c* of the receiver portion 53 on one side. The first receiver-side joint portion 71 is thus open in the lengthwise direction of the second path-restricting member 50 in the end portion 53*c* of the receiver portion 53. Accordingly, the second receiver-side joint portion 81 can be attached to the first receiver-side joint portion 71 from the opening on the end portion 53*c* side by sliding the second receiver-side joint portion 81 in the lengthwise direction of the second path-restricting member 50.

Also, the first lid-side joint portion 72 extends in the lengthwise direction of the second path-restricting member 50 to an end portion 54*c* of the lid portion 54 on one side. The first lid-side joint portion 72 is thus open in the lengthwise direction of the second path-restricting member 50 in the end portion 54*c* of the lid portion 54. Accordingly, the second lid-side joint portion 82 can be attached to the first lid-side joint portion 72 from the opening on the end portion 54c side by sliding the second lid-side joint portion 82 in the lengthwise direction of the second path-restricting member 50.

As shown in FIG. 5, the first receiver-side joint portion 71 has a first movement restricting portion 76 (first movement restrictor) that restricts movement of the second receiver-side joint portion 81 in the lengthwise direction of the second path-restricting member 50. The first movement restricting portion 76 is a bottom wall of the first receiver-side joint portion 71 that extends in the lengthwise direction of the second path-restricting member 50. When the second receiver-side joint portion 81 is in a state of being fitted to the first receiver-side joint portion 71, the first movement restricting portion 76 opposes the second receiver-side joint portion 81 in the lengthwise direction of the second path-restricting member 50. The first movement restricting portion 76 thus restricts movement, in the lengthwise direction of the second path-restricting member 50, of the second receiver-side joint portion 81 located in the first receiver-side joint portion 71. Note that the first movement restricting portion 76 is similarly provided in the first lid-side joint portion 72, and works similarly with respect to the second lid-side joint portion 82.

The first receiver-side joint portion 71 has a second movement restricting portion 77 that restricts movement of the second receiver-side joint portion 81 in the lengthwise direction of the second path-restricting member 50. The second movement restricting portion 77 is a protrusion that protrudes from an inner face of the second accommodating portion 74 of the first receiver-side joint portion 71, for example. When the second receiver-side joint portion 81 is slid to be attached to the first receiver-side joint portion 71, the second receiver-side side joint portion 81 slides over the second movement restricting portion 77. The second movement restricting portion 77 restricts movement, in the lengthwise direction of the second path-restricting member 50, of the second receiver-side joint portion 81 fitted to the first receiver-side joint portion 71. Accordingly, the first movement restricting portion 76 restricts movement of the second receiver-side joint portion 81 toward one side in the lengthwise direction, and the second movement restricting portion 77 restricts movement of the second receiver-side joint portion 81 toward the other side in the lengthwise direction.

Effects of the present embodiment will be described.

(1) The second joint portion 62 of the fixing member 60 is joined to the first joint portion 58 that is provided in portions, in the circumferential direction, of the covering portion 52 of the second path-restricting member 50. This eliminates the need to employ a mode in which the second joint portion 62 covers the entire periphery of the covering portion 52 that overlaps the first path-restricting member 40 in the radial direction. Accordingly, the area where the fixing member 60 is attached can be downsized in the radial direction.

(2) The second path-restricting member 50 includes a body portion 51 that restricts the path of the wire harness body 11, and the receiver portion 53 provided at an end portion of the body portion 51 in the lengthwise direction of the wire harness body 11. Further, the second path-restricting member 50 has a lid portion 54 that covers the entire periphery of the end portion 40a of the first path-restricting member 40 in the lengthwise direction together with the receiver portion 53. The receiver portion 53 and the lid portion 54 constitute the covering portion 52. This configuration enables the receiver portion 53 and the lid portion 54 to constitute the covering portion 52 that covers the periphery of the end portion 40a of the first path-restricting member 40.

(3) The first joint portion 58 has a first receiver-side joint portion 71 that is provided in the receiver portion 53, and a first lid-side joint portion 72 that is provided in the lid portion 54. The second joint portion 62 has a second receiver-side joint portion 81 that is joined to the first receiver-side joint portion 71, and a second lid-side joint portion 82 that is joined to the first lid-side joint portion 72. According to this configuration, the receiver portion 53 and the lid portion 54 are joined to each other via the second receiver-side joint portion 81 and the second lid-side joint portion 82 when the fixing member 60 is in a state of being attached to the covering portion 52. That is, the lid portion 54 can be kept from withdrawing from the receiver portion 53 by attaching the fixing member 60 to the covering portion 52.

(4) The covering portion 52 has a hinge portion 55 that connects the first circumferential end portion 53a of the receiver portion 53 to the first circumferential end portion 54a of the lid portion 54. The lid portion 54 is rotatable between the open position and the closed position at which the lid portion 54 covers the wire harness body 11, with the hinge portion 55 as a rotation axis. The first receiver-side joint portion 71 is provided at the first circumferential end portion 53a of the receiver portion 53. The first lid-side joint portion 72 is provided at the first circumferential end portion 54a of the lid portion 54. According to this configuration, the fixing member 60 in a state of being attached to the covering portion 52 makes it difficult for the lid portion 54 located at the closed position to rotate in the opening direction. That is, the fixing member 60 attached to the covering portion 52 makes it easy to maintain the lid portion 54 located at the closed position.

The lock portions 56 and the claw portions 57 that are locked to each other to maintain the closed state of the lid portion 54 are provided at the second circumferential end portion 53b of the receiver portion 53 and the second circumferential end portion 54b of the lid portion 54, respectively. The lock portions 56 and the claw portions 57 tend portion to be larger than the hinge portion 55 in the radial direction of the covering portion 52. Accordingly, the fixing member 60 is configured to be fixed to the covering portion 52 on the hinge portion 55 side. This configuration further contributes to downsizing, in the radial direction, of the area where the fixing member 60 is attached.

(5) The first joint portion 58 has recessed portions, and the second joint portion 62 has protrusions that are fitted to the first joint portion 58. According to this configuration, the first joint portion 58 can be joined to the second joint portion 62 with a simple configuration.

(6) The second joint portion 62 can be attached to the first joint portion 58 by sliding the second joint portion 62 in the lengthwise direction of the second path-restricting member 50. This configuration enables the second joint portion 62 to be attached to the first joint portion 58 by sliding the second joint portion 62 in the lengthwise direction of the second path-restricting member 50. Therefore, the fixing member 60 can be easily attached to the covering portion 52 of the second path-restricting member 50.

(7) The first joint portion 58 has first movement restricting portions 76 and second movement restricting portions 77 that restrict movement of the second joint portion 62 in the lengthwise direction of the second path-restricting member 50. According to this configuration, the first movement restricting portions 76 and the second movement restricting portions 77 can keep the second joint portion 62 from withdrawing from the first joint portion 58.

(8) The first path-restricting member 40 restricts the path of the linear portion 11A, which is a linear part of the path of the wire harness body 11. The second path-restricting member 50 restricts the path of the bent portion 11B, which is a bent part of the path of the wire harness body 11. This configuration continuously keeps the paths of the linear portion 11A and the bent portion 11B of the wire harness body 11 from deriving from respective desired paths.

The present embodiment can be modified as follows for implementation. The above embodiment and the following modifications can be implemented in combination as long as no technical contradiction arises.

The second joint portion 62 of the above embodiment is attachable to the first joint portion 58 in the lengthwise direction of the second path-restricting member 50, but the second joint portion 62 not specifically limited thereto. For example, the second joint portion 62 may alternatively be attachable to the first joint portion 58 from the radially outer side of the covering portion 52.

Figure 6:
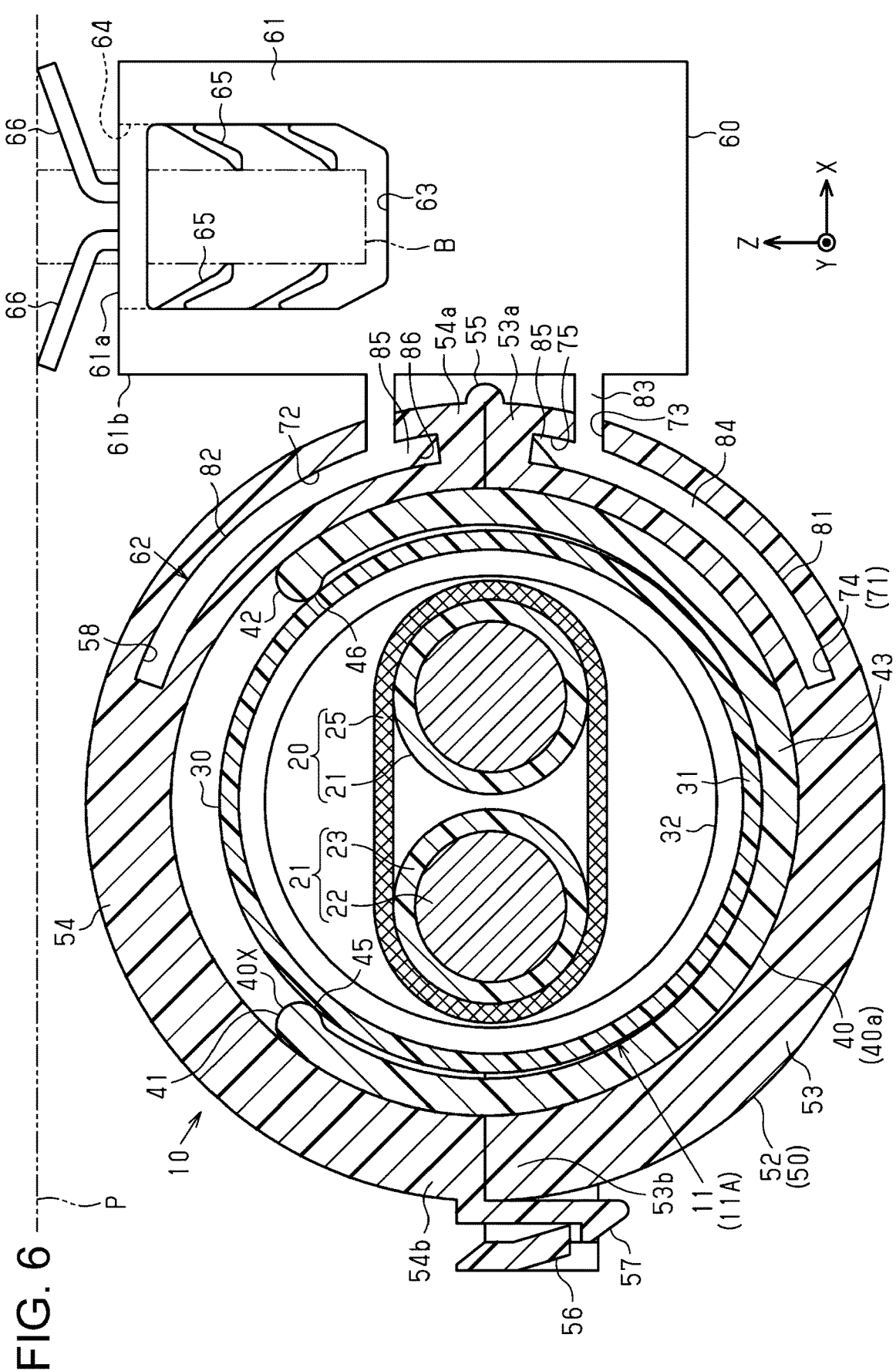
FIG. 6 is a schematic lateral cross-sectional view of a wire harness of a modification.

For example, in the configuration shown in FIG. 6, the second joint portion 62 is attachable to the first joint portion 58 from the radially outer side of the covering portion 52. In the second joint portion 62 in this same configuration, the extension 85 has, in its side face on the inner-circumferential side, an inclined face 86 whose thickness in the radial direction decreases toward the leading end of the extension 85. When the second joint portion 62 is fitted to the first joint portion 58 in this configuration, first, the leading end of the extension 84 is inserted from the first accommodating portion 73 into the second accommodating portion 74, from the outer-circumferential side of the covering portion 52. Thereafter, the extension 85 is inserted from the first accommodating portion 73 into the second accommodating portion 75. Here, the extension 85, which has the inclined face 86, can be easily inserted into the first joint portion 58. This configuration also enables downsizing, in the radial direction, of the area where the fixing member 60 is attached since the second joint portion 62 and the first joint portion 58 are provided in portions of the second path-restricting member 50 in the circumferential direction.

The thickness of the covering portion 52 in the radial direction in the area where the first receiver-side joint portion 71 and the first lid-side joint portion 72 are not provided may be smaller than the thickness thereof in the area where the first receiver-side joint portion 71 and the first lid-side joint portion 72 are provided. This configuration further contributes to downsizing, in the radial direction, of the area where the fixing member 60 is attached.

The location in the covering portion 52 in which the first joint portion 58 is provided is not limited to the above embodiment. For example, the first receiver-side joint portion 71 and the first lid-side joint portion 72 may alternatively be provided at the second circumferential end portion 53b of the receiver portion 53 and the second circumferential end portion 54b of the lid portion 54, respectively. That is, the first joint portion 58 may be provided on the opposite side to the hinge portion (i.e., on the size on which the lock portions 56 and the claw portions 57 are provided) in the covering portion 52.

The number of first receiver-side joint portions 71 and the number of second receiver-side joint portions 81 are not limited to one as in the above embodiment, and may alternatively be two or more. Similarly, the number of first lid-side joint portions 72 and the number of second lid-side joint portions 82 are not limited to one as in the above embodiment, and may alternatively be two or more.

In the above embodiment, either the pair of the first receiver-side joint portion 71 and the second receiver-side joint portion 81 or the pair of the first lid-side joint portion 72 and the second lid-side joint portion 82 may be omitted. That is, the covering portion 52 may have the first joint portion 58 in only either the receiver portion 53 or the lid portion 54.

The relationship between the first joint portion 58 and the second joint portion 62 as to which one is a protrusion or a recess is not limited to the above embodiment. That is, a configuration may alternatively be employed in which the second joint portion 62 is recessed and the first joint portion 58 is protruding and fitted to the second joint portion 62. With this configuration as well, the first joint portion 58 and the second joint portion 62 can be joined with a simple configuration.

In the above embodiment, the covering portion 52 has the receiver portion 53 and the lid portion 54. However, the covering portion 52 is not limited to this configuration, and may be modified to have a cylindrical shape that cannot be disassembled or deformed. Further, in the above embodiment, the receiver portion 53 is integrally molded with the lid portion 54 via the thin-walled hinge portion 55. The lid portion 54 is locked to the receiver portion 53 through engagement between the lock portions 56 and the claw portions 57 in the closed state. However, the receiver portion 53 and the lid portion 54 may be modified so as to be fixed with another structure.

The fixture portion 61 of the above embodiment is of a type that is fixed to the bolt B extending from the panel P. However, the fixture portion 61 is not limited to this configuration. The fixture portion 61 can be modified to a type that is fixed to a plate-like mounting piece extending from the panel P, or a type that is fixed by being inserted into a hole formed in the panel P, for example.

The second path-restricting member 50 of the above embodiment is formed to restrict the path of the bent portion 11B of the wire harness body 11. However, the second path-restricting member 50 is not limited to this configuration. For example, the second path-restricting member 50 may be modified to have a shape that restricts the path of the linear portion 11A of the wire harness body 11. The second path-restricting member 50 in this case is modified so that the bent shape of the body portion 51 is changed to a linearly extending shape, for example.

The structure of the first path-restricting member 40 of the above embodiment can be modified as appropriate. For example, as long as the first path-restricting member 40 has the insertion opening 40X and has a structure that can be attached to the periphery of the covering member 30, other structures thereof are not specifically limited.

The protruding portion 45 of the above embodiment may be provided at a position farther from the insertion opening 40X than the leading end of the first end portion 41 in the circumferential direction of the first path-restricting member 40.

The protruding portion 46 of the above embodiment may be provided at a position farther from the insertion opening 40X than the leading end of the second end portion 42 in the circumferential direction of the first path-restricting member 40.

The protruding portions 45 and 46 of the above embodiment may be provided in portions of the first path-restricting member 40 in the lengthwise direction.

At least either the protruding portion 45 or 46 of the above embodiment may be omitted.

The shape of the joint portion 43 of the first path-restricting member 40 of the above embodiment is not limited to an arc shape, and can be modified to an elliptical shape or a U-shape, for example.

In the above embodiment, the first path-restricting member 40 and the second path-restricting member 50 are harder than the covering member 30, but there is no limitation to this configuration. The first path-restricting member 40 and the second path-restricting member 50 may be as hard as or less hard than the covering member 30. That is, the first path-restricting member 40 and the second path-restricting member 50 need only act to make the wire harness body 11 less likely to bend than when the first path-restricting member 40 and the second path-restricting member 50 are not attached thereto.

The covering member 30 of the above embodiment may be a resin corrugated tube with a metal layer containing a metallic material provided on an outer face thereof, for example.

The covering member 30 of the above embodiment is not limited to a corrugated tube, and may alternatively be, for example, a covering member that does not have a large-diameter portion 31 or a small-diameter portion 32.

The covering member 30 of the above embodiment may have slits extending in the lengthwise direction of the covering member 30.

In the above embodiment, the electric wires 21 are high-voltage electric wires. However, the electric wires 21 are not limited to this configuration, and may alternatively be low-voltage electric wires, for example.

In the electric wire member 20 of the above embodiment, the electromagnetic shield member is embodied as the braided member 25. However, the electromagnetic shield member is not limited to this configuration. For example, the electromagnetic shield member of the electric wire member 20 may alternatively be embodied as a metal foil.

The braided member 25 in the electric wire member 20 of the above embodiment may be omitted.

In the above embodiment, the number of electric wires 21 that constitute the electric wire member 20 is two. However, the number of electric wires 21 is not limited thereto. The number of electric wires 21 may be one, or may be three or more.

The arrangement relationship between the inverter M1 and the high-voltage battery M2 in the vehicle V is not limited to the above embodiment, and may be changed as appropriate, as per the vehicle configuration.

In the above embodiment, a plurality of in-vehicle devices to which the wire harness 10 is electrically connected are embodied as the inverter M1 and the high-voltage battery M2. However, the in-vehicle devices are not limited thereto. The plurality of in-vehicle devices to which the wire harness 10 is electrically connected are not specifically limited as long as they are electrical devices installed in the vehicle V.

The embodiment and the modifications disclosed herein are examples in all respects, and the present disclosure is not limited to these examples. That is, the scope of the present disclosure is indicated by the claims, and is intended to encompass all modifications within the meaning and scope equivalent to the claims.

What is claimed is:

1. A wire harness comprising:
   a wire harness body having an electric wire and a first cover covering a periphery of the electric wire;
   a first path restrictor attached to a periphery of the first cover and restricting a path of the wire harness body;
   a second path restrictor attached to the periphery of the first cover and restricting the path of the wire harness body; and
   a fixing member for fixing the second path restrictor to an attachment target, wherein:
   the first path restrictor is open in a direction orthogonal to a lengthwise direction of the first path restrictor, and has an insertion opening extending over an entirety of the first path restrictor in the lengthwise direction thereof,
   the second path restrictor has a second cover covering a periphery of an end of the first path restrictor in the lengthwise direction thereof,
   the second cover has a first joint provided at a portion of the wire harness body in a circumferential direction thereof,
   the fixing member has a fixture to be fixed to the attachment target, and a second joint joined to the first joint,
   the second path restrictor includes: a body restricting the path of the wire harness body; a receiver provided at an end of the body in the lengthwise direction of the wire harness body; and a lid covering, together with the receiver, an entire periphery of the end of the first path restrictor in the lengthwise direction thereof,
   the receiver and the lid form the second cover,
   the first joint has a first receiver-side joint provided in the receiver, and a first lid-side joint provided in the lid, and
   the second joint has a second receiver-side joint joined to the first receiver-side joint, and a second lid-side joint joined to the first lid-side joint.

2. The wire harness according to claim 1, wherein:
   the second cover has a hinge connecting a first circumferential end of the receiver to a first circumferential end of the lid,
   the lid is rotatable between an open position and a closed position at which the lid covers the wire harness body, with the hinge as a rotation axis,
   the first receiver-side joint is provided at the first circumferential end of the receiver, and
   the first lid-side joint is provided at the first circumferential end of the lid.

3. The wire harness according to claim 1,
   wherein one of the first joint and the second joint is a recess, and the other one of the first joint and the second joint is a protrusion fitted to the recess.

4. The wire harness according to claim 1,
   wherein the second joint is attachable to the first joint by sliding the second joint in a lengthwise direction of the second path restrictor.

5. The wire harness according to claim 4,
wherein the first joint has a movement restrictor restricting movement of the second joint in the lengthwise direction of the second path restrictor.

6. The wire harness according to claim 1, wherein:
the wire harness body includes a linear part and a bent part,
the first path restrictor has a body having a linear shape and restricts a path of the linear part, and
the second path restrictor has a body having a bent shape and restricts a path of the bent part.

* * * * *